United States Patent
Riva et al.

(10) Patent No.: US 12,540,665 B2
(45) Date of Patent: Feb. 3, 2026

(54) DRIVEN PULLEY FOR A CONTINUOUSLY VARIABLE TRANSMISSION

(71) Applicant: BRP-ROTAX GMBH & CO. KG, Gunskirchen (AT)

(72) Inventors: Giacomo Riva, Wels (AT); Karl Glinsner, Wels (AT); Patrick Eisenkoeck, Neukirchen am Walde (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/647,376

(22) Filed: Apr. 26, 2024

(65) Prior Publication Data

US 2024/0360897 A1 Oct. 31, 2024

Related U.S. Application Data

(60) Provisional application No. 63/462,764, filed on Apr. 28, 2023.

(51) Int. Cl.
*F16H 55/56* (2006.01)
*F16H 9/14* (2006.01)

(52) U.S. Cl.
CPC ............ *F16H 55/56* (2013.01); *F16H 9/14* (2013.01)

(58) Field of Classification Search
CPC .. F16H 55/56; F16H 61/66272; F16H 63/067; F16H 9/14; F16H 9/18; F16H 55/563
(Continued)

(56) References Cited

U.S. PATENT DOCUMENTS 5,720,681 A * 2/1998 Benson ............... F16H 63/067
474/10
6,120,399 A * 9/2000 Okeson ................. F16H 55/56
474/14

(Continued)

FOREIGN PATENT DOCUMENTS

| WO | 2007124604 A1 | 11/2007 |
| WO | 2008148208 A1 | 12/2008 |
| WO | 2015151032 A1 | 10/2015 |

OTHER PUBLICATIONS

Polaris, RZR Trail 570 White, Assembly Menu-Drive Train Secondary Clutch, retrieved from https://www.polaris.com/en-us/off-road/assembly/?modelId=Z21RAE92AS&assemblyId=442620 on Apr. 25, 2024.

(Continued)

*Primary Examiner* — Henry Y Liu
(74) *Attorney, Agent, or Firm* — BCF LLP

(57) ABSTRACT

A driven pulley for a continuously variable transmission has a fixed sheave; a movable sheave; a spring biasing the movable sheave axially toward the fixed sheave; and at least one roller assembly connected to one of the sheaves. Another one of the sheaves has at least one ramp configured for abutting the at least one roller assembly. Each roller assembly has: a pin and a roller. The pin has: a first pin portion received in an aperture defined in the one of the sheaves; a second pin portion extending radially from the one of the sheaves; and an annular flange disposed radially between the first and second pin portions. The flange abuts a surface of the one of the sheaves surrounding the aperture. The roller is disposed on the second pin portion. The annular width of the flange is at least half of the annular width of the roller.

20 Claims, 17 Drawing Sheets

(58) Field of Classification Search
USPC .................................................. 474/19, 21
See application file for complete search history.

(56) References Cited

U.S. PATENT DOCUMENTS

| | | | | |
|---|---|---|---|---|
| 6,149,540 | A * | 11/2000 | Johnson | F16H 61/66227 474/46 |
| 6,569,043 | B2 * | 5/2003 | Younggren | F16H 55/56 474/19 |
| 6,743,129 | B1 * | 6/2004 | Younggren | F16H 55/56 474/19 |
| 6,837,353 | B2 * | 1/2005 | Watt | F16H 55/56 192/93 A |
| 6,953,400 | B2 * | 10/2005 | Kalies | F16H 55/56 474/19 |
| 7,037,226 | B2 * | 5/2006 | Zulawski | F16H 55/56 474/19 |
| 7,081,057 | B2 * | 7/2006 | Kalies | F16H 55/56 474/8 |
| 7,674,197 | B2 * | 3/2010 | Aitcin | F16H 61/66272 474/10 |
| 8,496,551 | B2 * | 7/2013 | Mueller | F16H 7/02 474/17 |
| 8,958,961 | B2 * | 2/2015 | Dec | F16H 61/66259 474/30 |
| 9,500,264 | B2 * | 11/2016 | Aitcin | B62M 27/02 |
| 10,641,366 | B2 * | 5/2020 | Kuhl | F16H 9/18 |
| 2002/0065156 | A1 * | 5/2002 | Younggren | F16H 55/56 474/8 |
| 2002/0123400 | A1 * | 9/2002 | Younggren | F16H 63/067 474/14 |
| 2004/0266570 | A1 * | 12/2004 | Kalies | F16H 63/067 474/19 |
| 2005/0209032 | A1 * | 9/2005 | Aitcin | F16H 55/56 474/19 |

OTHER PUBLICATIONS

Polaris, RZR Trail 570 White, Assembly Menu-Drive Train Secondary Clutch, retrieved from https://www.polaris.com/en-us/off-road/assembly/?modelId=Z20CHA57A2&assemblyId=230586 on Apr. 25, 2024.

Polaris, RZR Trail 570 White, Assembly Menu-Drive Train Secondary Clutch, retrieved from https://www.polaris.com/en-us/off-road/assembly/?modelId=Z20CHA57A2&assemblyId=182990 on Apr. 25, 2024.

Extended European Search Report issued from the EPO on Jun. 18, 2024 in connection with the corresponding application No. 24172101.8.

* cited by examiner

DRIVEN PULLEY FOR A CONTINUOUSLY VARIABLE TRANSMISSION

CROSS-REFERENCE

The present application claim priority to U.S. Provisional Patent Application No. 63/462,764, filed Apr. 28, 2023, the entirety of which is incorporated herein by reference.

FIELD OF TECHNOLOGY

The present technology relates to driven pulleys for continuously variable transmissions, to continuously variable transmissions, and to powertrains have continuously variable transmissions.

BACKGROUND

A continuously variable transmission (CVT) is a type of automatic transmission found in many vehicles. It typically includes a drive pulley, a driven pulley and a belt looped around the drive and driving pulleys. The drive pulley is driven by the motor. The driven pulley is driven by the drive pulley via the belt. The driven pulley drives the propulsion device of the vehicle, such as wheels for example. A CVT provides a continuous change in gear ratios which is advantageous compared to geared transmission that only provide a set number of gear ratios.

Each of the drive pulley and the driven pulley have a fixed sheave and a movable sheave that moves axially relative to the fixed sheave. As the movable sheaves move relative to the fixed sheaves, the gear ratio changes. As the movable sheave of the drive pulley moves toward the fixed sheave of the drive pulley, thus increasing the effective diameter of the drive pulley, the movable sheave of the driven pulley moves away from the fixed sheave of the driven pulley, thus reducing the effective diameter of the driven pulley, and vice versa.

In some embodiments, the drive pulley has a spring biasing the movable sheave away from the fixed shave and centrifugal weights that push the movable sheave toward the fixed sheave as the speed of rotation of the drive pulley increases.

In some embodiments, the driven pulley has a spring biasing the movable sheave toward the fixed sheave. The movable sheave moves away from the fixed sheave due to the action of the belt in response to an increase of the effective diameter of the drive pulley (i.e., the movable sheave of the drive pulley moving toward the fixed sheave of the drive pulley). The manner in which the driven pulley reacts to the change in effective diameter of the drive pulley depends in part on the spring being used, and the shape and angle of the inclined surfaces of the fixed and movable sheaves.

In order to provide additional control on how the driven pulley reacts to the change in effective diameter of the drive pulley, some driven pulleys are also provided with ramps on the movable sheave that are engaged by sliders or rollers provided on the fixed sheave. The shape of the ramps determines how much force is required to move the movable sheave relative to the fixed sheave.

Although the ramps with sliders or roller are effective at providing additional control over the reaction of the driven pulley, the forces applied to the connection between the sliders or rollers and the fixed sheave can lead to high localized stress. In some cases, this can lead to cracks forming in the fixed sheave at the location of the connection of the sliders or rollers.

One solution consists in using a stronger material for making the fixed sheave. However, as stronger material is typically heavier and/or more expensive.

There is therefore a desire for a driven pulley in which the above issue is addressed.

SUMMARY

It is an object of the present technology to ameliorate at least some of the inconveniences present in the prior art.

According to one aspect of the present technology, there is provided driven pulley for a continuously variable transmission having: a fixed sheave; a movable sheave operatively connected to the fixed sheave, the movable sheave being movable axially relative to the fixed sheave; a spring biasing the movable sheave axially toward the fixed sheave; and at least one roller assembly connected to one of the fixed sheave and the movable sheave. Another one of the fixed sheave and the movable sheave has at least one ramp configured for abutting the at least one roller assembly. Each roller assembly of the at least one roller assembly has a pin defining a radially extending pin axis and a roller. The pin has: a first pin portion received in an aperture defined in the one of the fixed sheave and the movable sheave; a second pin portion extending radially from the one of the fixed sheave and the movable sheave; and an annular flange disposed radially between the first pin portion and the second pin portion. The flange has a first annular width. The flange abuts a surface of the one of the fixed sheave and the movable sheave surrounding the aperture. The roller is disposed on the second pin portion. The roller is rotatable about the pin axis. The roller has at least one annular portion. The at least one annular portion of the roller has a second annular width. The first annular width is at least half of the second annular width.

In some embodiments, the movable sheave is rotatable relative to the fixed sheave.

In some embodiments, for each roller assembly of the at least one roller assembly: the at least one ramp comprises a first ramp and a second ramp; in response to the movable sheave rotating relative to the fixed sheave in a first direction, the roller abuts the first ramp; and in response to the movable sheave rotating relative to the fixed sheave in a second direction, the roller abuts the second ramp.

In some embodiments, for each roller assembly of the at least one roller assembly: the roller is slidable radially along the second pin portion.

In some embodiments, for each roller assembly of the at least one roller assembly: the first pin portion is longer than the second pin portion.

In some embodiments, for each roller assembly of the at least one roller assembly: the first annular width is at least 75 percent of the second annular width.

In some embodiments, for each roller assembly of the at least one roller assembly: the first annular width is at least 90 percent of the second annular width.

In some embodiments, for each roller assembly of the at least one roller assembly a spring pin is inserted through the first pin portion of the pin and the one of the fixed sheave and the movable sheave.

In some embodiments, for each roller assembly of the at least one roller assembly: the first pin portion has a threaded portion and an unthreaded portion; and the unthreaded portion is disposed radially between the threaded portion and the flange.

In some embodiments, for each roller assembly of the at least one roller assembly: a radius of the threaded portion is smaller than a radius of the unthreaded portion.

In some embodiments, for each roller assembly of the at least one roller assembly: the radius of the unthreaded portion of the first pin portion is equal to a radius of the second pin portion.

In some embodiments, for each roller assembly of the at least one roller assembly: the unthreaded portion is press-fit in the aperture.

In some embodiments, the at least one roller assembly is connected to the fixed sheave and the movable sheave has the at least one ramp.

In some embodiments, for each roller assembly of the at least one roller assembly: the second pin portion is radially inward of the first pin portion.

In some embodiments, the movable sheave has a hub defining the at least one ramp. The hub extends in the fixed sheave. For each roller assembly of the at least one roller assembly, the roller is disposed radially between the flange and the hub, and the roller is radially inward of the flange.

In some embodiments, for each roller assembly of the at least one roller assembly: a radial distance between a free end of the second pin portion and the hub is less than a height of the roller.

In some embodiments, for each roller assembly of the at least one roller assembly: the flange has a flange outer radius; the roller has a roller outer radius; and the flange outer radius is at least half of the roller outer radius.

In some embodiments, for each roller assembly of the at least one roller assembly: the flange outer radius is at least 90 percent of the roller outer radius.

In some embodiments, for each roller assembly of the at least one roller assembly: the flange outer radius is at least 70 percent of a height of the roller.

In some embodiments, the at least one roller assembly is two roller assemblies disposed opposite each other.

According to another aspect of the present technology, there is provided a continuously variable transmission having: a drive pulley; the driven pulley described above; and a belt looped around the drive and driven pulleys.

According to another aspect of the present technology, there is provided a powertrain for a vehicle comprising: a motor having a motor shaft; the continuously variable transmission described above, the drive pulley being operatively connected to and driven by the motor shaft; and a driveshaft operatively connected to and driven by the driven pulley.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight-ahead direction. Also for purposes of the present application, terms related to spatial orientation in a cylindrical coordinate system, such as axially and radially, when referring to components of the driven pulley should be understood in relation to an axis of rotation of the driven pulley.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not necessarily to scale.

DETAILED DESCRIPTION

Figure 1:
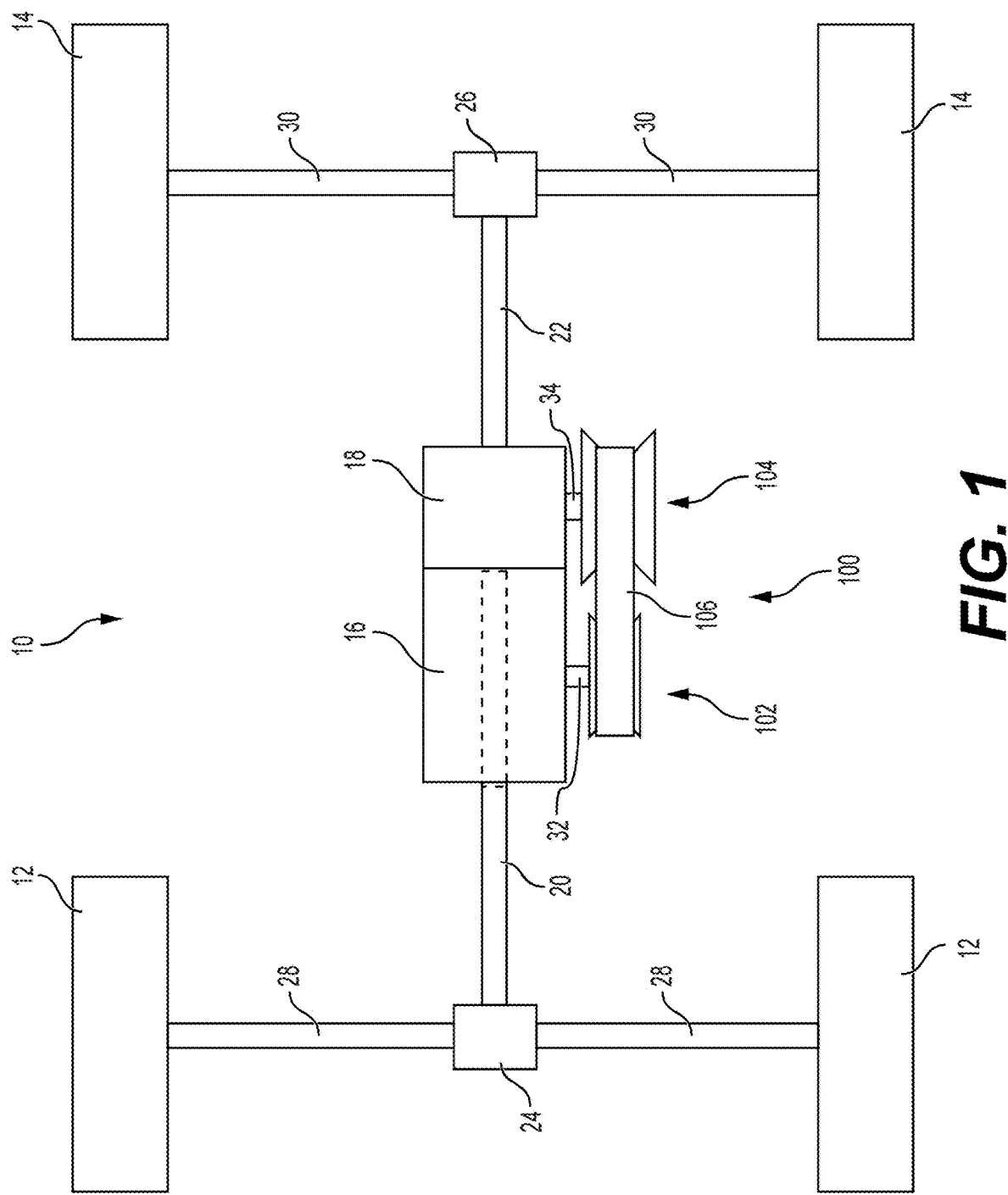
FIG. 1 is a schematic top view of a powertrain for a vehicle.

With reference to FIG. 1, a powertrain 10 for a vehicle according to the present technology will be described. In the illustrated embodiment, the powertrain 10 is configured for a vehicle having two front wheels 12 and two rear wheels 14, but other types of vehicles are contemplated. The powertrain 10 has a motor 16, a continuously variable transmission (CVT) 100, a geared transmission 18, front and rear driveshafts 20, 22, front and rear differentials 24, 26, and front and rear half-shafts 28, 30. The CVT 100 has a drive pulley 102, a driven pulley 104, and a belt 106 looped around the drive and driven pulleys 102, 104. The CVT 100 will be described in more detail below.

The drive pulley 102 is operatively connected to and driven by a motor shaft 32 of the motor 16. In the present embodiment, the motor 16 is a four-stroke internal combustion engine, but other types of motors are contemplated. In the present embodiment, the motor shaft 32 is a crankshaft of the motor 16. It is contemplated that the motor shaft 32 could be another shaft, such as, but not limited to, an output shaft that is coaxial to and driven by the crankshaft of the motor 16 or a counterbalance shaft of the motor 16. The drive pulley 102 drives the driven pulley 104 via the belt 106. A jackshaft 34 is operatively connected to and driven by the driven pulley 104. The geared transmission 18 is operatively connected to and driven by the jackshaft 34. In the present embodiment, the geared transmission 18 has two forward gears, commonly referred to as the high and low gears, a reverse gear, and a selector allowing the powertrain to operate in a two-wheel drive mode or a four-wheel drive mode. It is contemplated that in alternative embodiments, a geared transmission having more or less gears or a different type of transmission could be used. It is also contemplated that in some embodiments, the geared transmission 18 could be omitted. The front and rear driveshafts 20, 22 are operatively connected to and driven by the geared transmission 18. The front driveshaft 20 extends forward from the geared transmission 18 and the rear driveshaft 22 extends rearward from the geared transmission 18. The front driveshaft 20 is operatively connected to and drives the front differential 24. The front differential 24 is operatively connected to and drives the front half-shafts 28. The front half-shafts 28 are operatively connected to and drive the front wheels 12. The rear driveshaft 22 is operatively connected to and drives the rear differential 26. The rear differential 26 is operatively connected to and drives the rear half-shafts 30. The rear half-shafts 30 are operatively connected to and drive the rear wheels 14.

Figure 2:
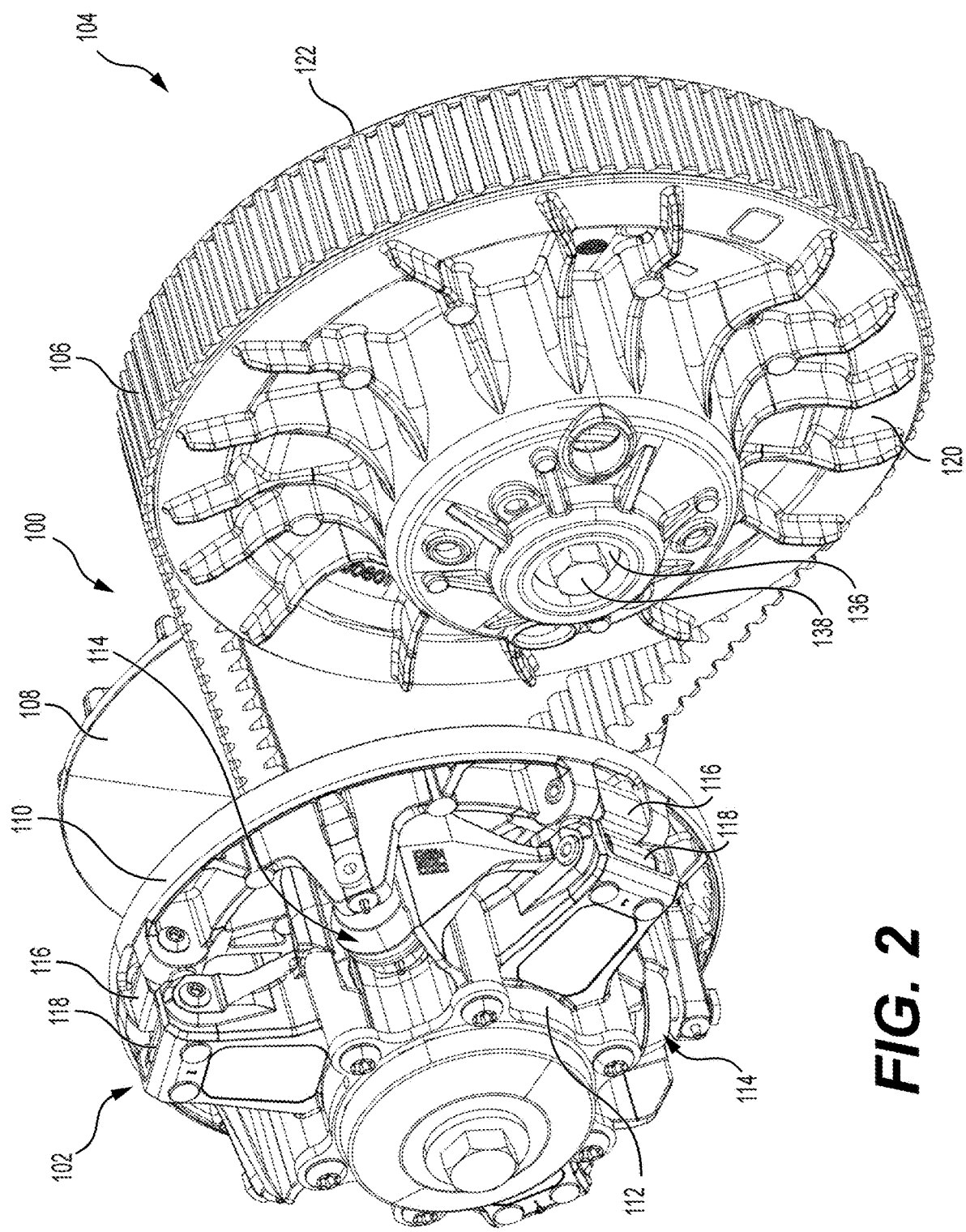
FIG. 2 is a perspective view, taken from a rear, left side, of a continuously variable transmission (CVT) of the powertrain of FIG. 1.

With reference to FIG. 2, the CVT 100 will be described in more detail. As described above, the CVT 100 has the drive pulley 102, the driven pulley 104, and the belt 106. In the present embodiment, the belt 106 is a polymeric, toothed, flat belt. It is contemplated that in alternative embodiments a different type of belt 106 could be used, such as, but not limited to, a V-belt or a metallic belt made of multiple chain links.

The drive pulley 102 has a fixed sheave 108, a movable sheave 110 and a spider 112. The fixed and movable sheaves 108, 110 are frustoconical sheaves 108, 110. The fixed sheave 108 is disposed between the movable sheave 110 and the motor 16. The movable sheave 110 is disposed between the spider 112 and the fixed sheave 108. The fixed sheave 108 is rotationally and axially fixed relative to the motor shaft 32. The movable sheave 110 is rotationally fixed relative to the motor shaft 32 but is movable axially so as to change the distance between the fixed and movable sheaves 108, 110, thereby changing the effective diameter of the drive pulley 102. A spring (not shown) biases the movable sheave 110 away from the fixed sheave 108. The spider 112 is rotationally and axially fixed relative to the motor shaft 32. Roller assemblies 114 are mounted to the movable sheave 110 and transfer torque between the spider 112 and the movable sheave 110. Arms 116 are pivotally mounted to the movable sheave 110 and abut rollers 118 mounted to the spider 112. As the speed of rotation of the drive pulley 102 increases, the arms 116 pivot outwardly, thereby pushing against the rollers 118, which pushes the movable sheave 110 toward the fixed sheave 108. Additional details of the drive pulley 102 can be found in U.S. Pat. No. 9,500,264, issued Nov. 22, 2016, the entirety of which is incorporated herein by reference, which describes and shows a similar drive pulley.

Figure 3:
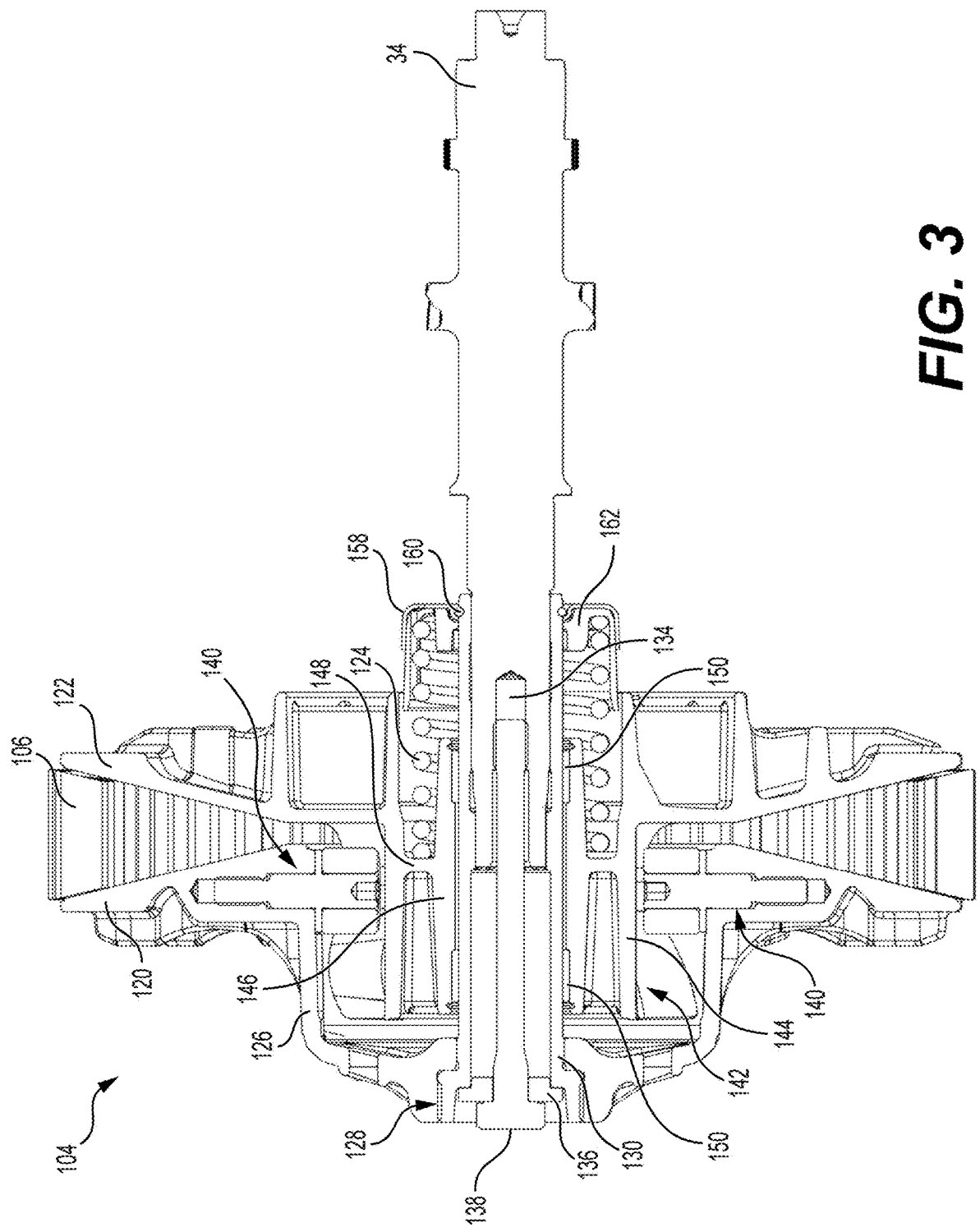
FIG. 3 is a cross-section of a driven pulley and belt of the CVT of FIG. 2 and of an associated driveshaft, the cross-section being taken vertically through a center of the driven pulley.

With reference to FIGS. 2 and 3, the driven pulley 104 has a fixed sheave 120 and a movable sheave 122. The fixed and movable sheaves 120, 122 are frustoconical sheaves 120, 122. The fixed and movable sheaves 120, 122 are made of aluminum, but other materials are contemplated. The movable sheave 122 is disposed between the fixed sheave 120 and the transmission 18. The fixed sheave 120 is rotationally and axially fixed relative to the jackshaft 34. The movable sheave 122 is movable rotationally and axially relative to the fixed sheave 120 and the jackshaft 34 so as to change the distance between the fixed and movable sheaves 120, 122, thereby changing the effective diameter of the driven pulley 104. A spring 124 biases the movable sheave 122 toward the fixed sheave 120. As the movable sheave 110 of the drive pulley 102 moves toward the fixed sheave 108 of the drive pulley 102, the movable sheave 122 of the driven pulley 104 moves away from the fixed sheave 120 of the driven pulley 104, and vice versa. Torque variations on the jackshaft 34 can also result in variations in the effective diameter of the driven pulley 104, in which case the effective diameter of the drive pulley 102 will be adjusted accordingly.

Figure 4:
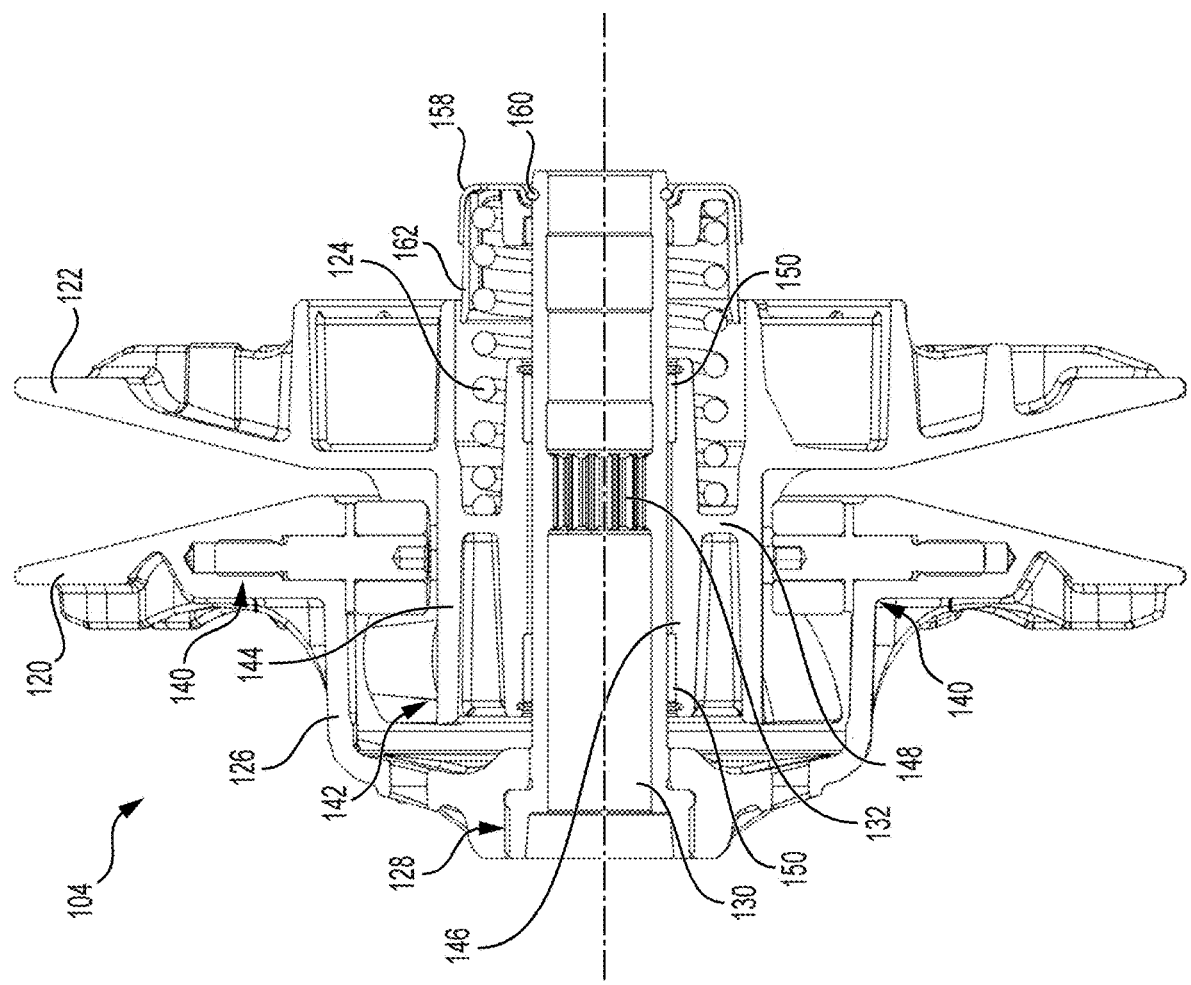
FIG. 4 is a cross-section of the driven pulley of the CVT of FIG. 2 with a movable sheave of the driven pulley being at its position closest to a fixed sheave of the driven pulley, the cross-section being taken vertically through the center of the driven pulley.

The fixed sheave 120 has a hub 126. The hub 126 defines a counterbored central aperture 128. A sleeve 130 is inserted in the aperture 128 so as to extend through the fixed and movable sheaves 120, 122. It is contemplated that in some embodiments, one or more locking pins could be inserted through the end of the fixed sheave 120 and the end of the sleeve 130 to help prevent relative movement between the fixed sheave 120 and the sleeve 130. The sleeve 130 defines internal splines 132 (FIG. 4). The jackshaft 34 is inserted in the sleeve 130. The end of the jackshaft 34 has external splines (not shown) engaging the internal splines 132. The end of the jackshaft 34 also defines a threaded aperture 134. A cap 136 is disposed in the end of the sleeve 130. A bolt 138 is inserted through the cap 136 and is screwed into the threaded aperture 134, thereby connecting the fixed sheave 120, the sleeve 130 and the jackshaft 34 together.

Figure 5:
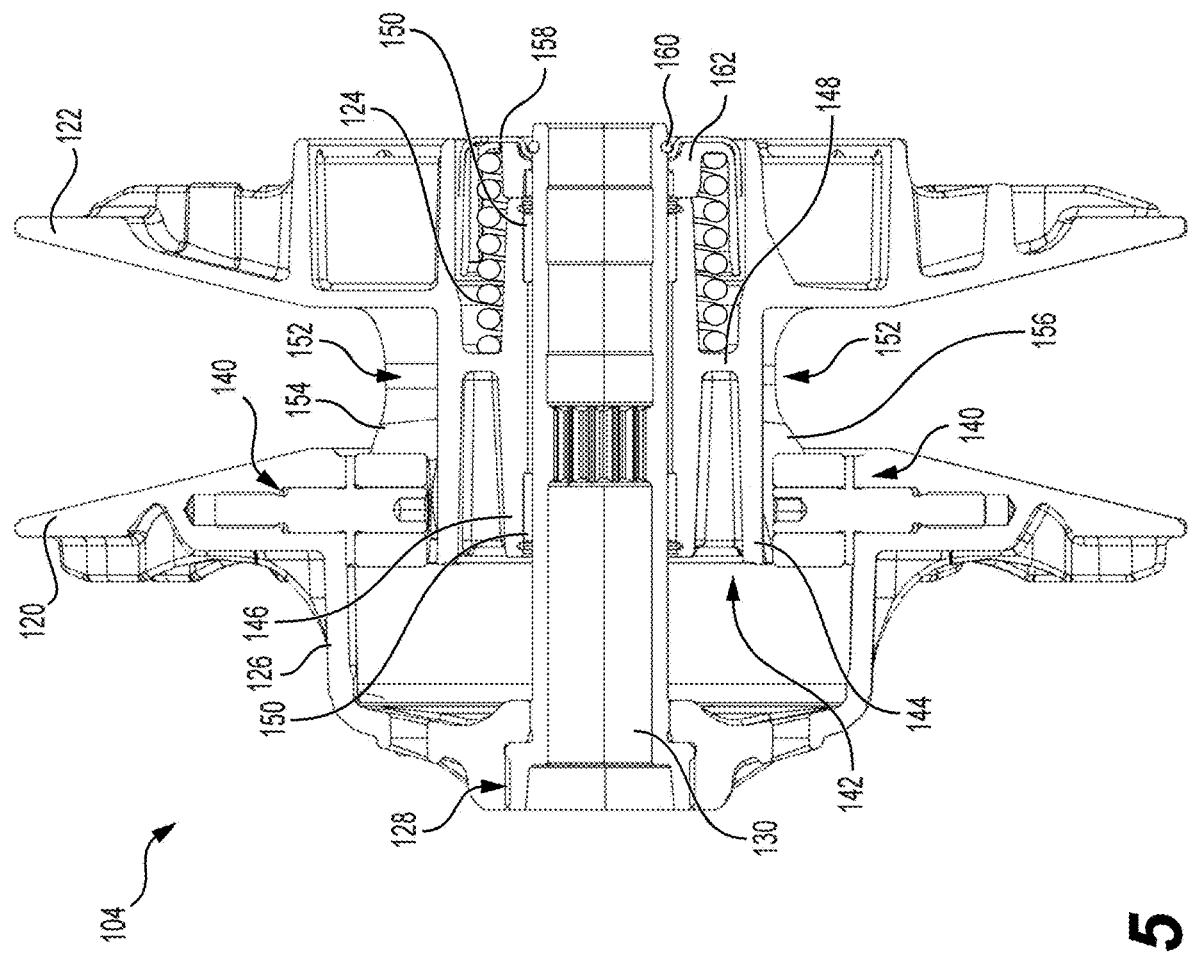
FIG. 5 is a cross-section of the driven pulley of the CVT of FIG. 2 with the movable sheave being at its position furthest from the fixed sheave, the cross-section being taken vertically through the center of the driven pulley.
Figure 6:
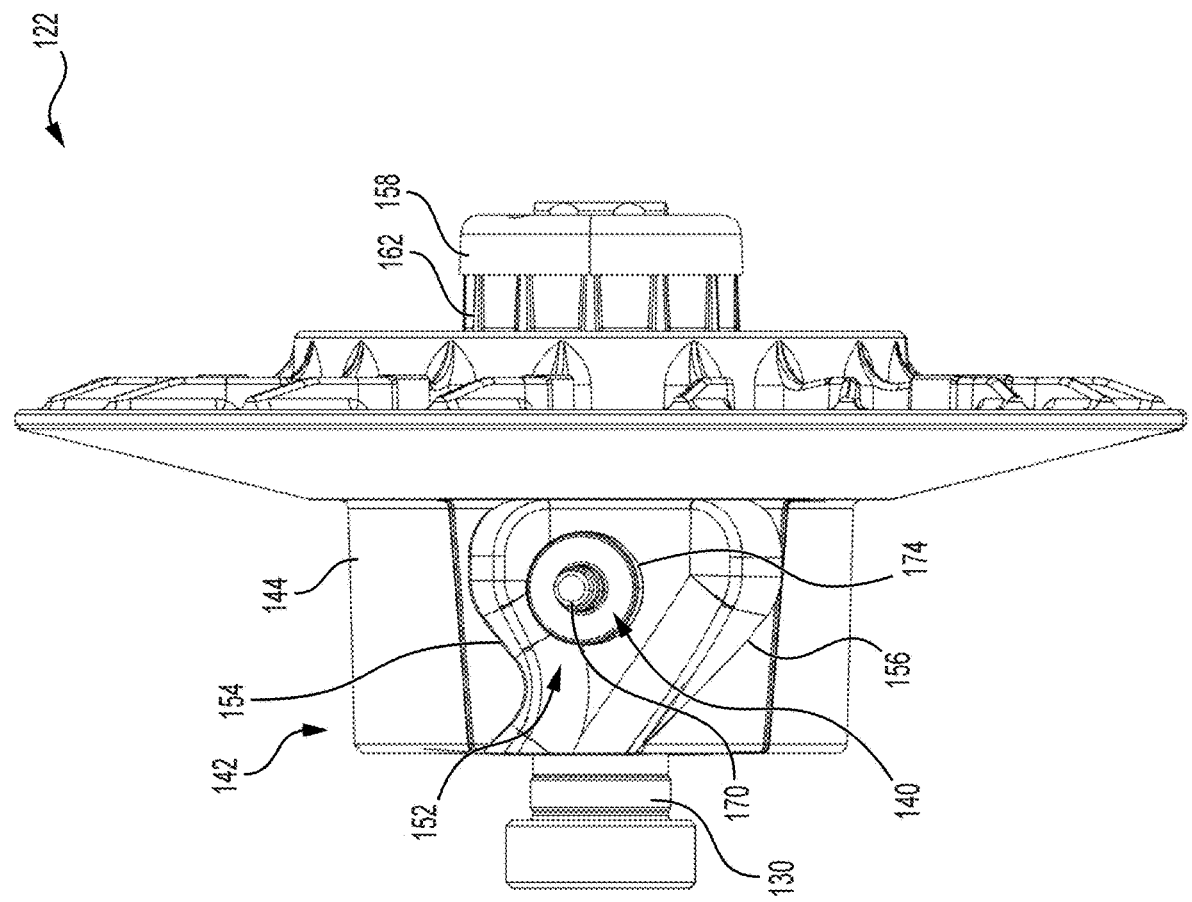
FIG. 6 is a top view of a roller assembly and of a movable sheave of the driven pulley of FIG. 4 when the driven pulley is at rest.
Figure 7:
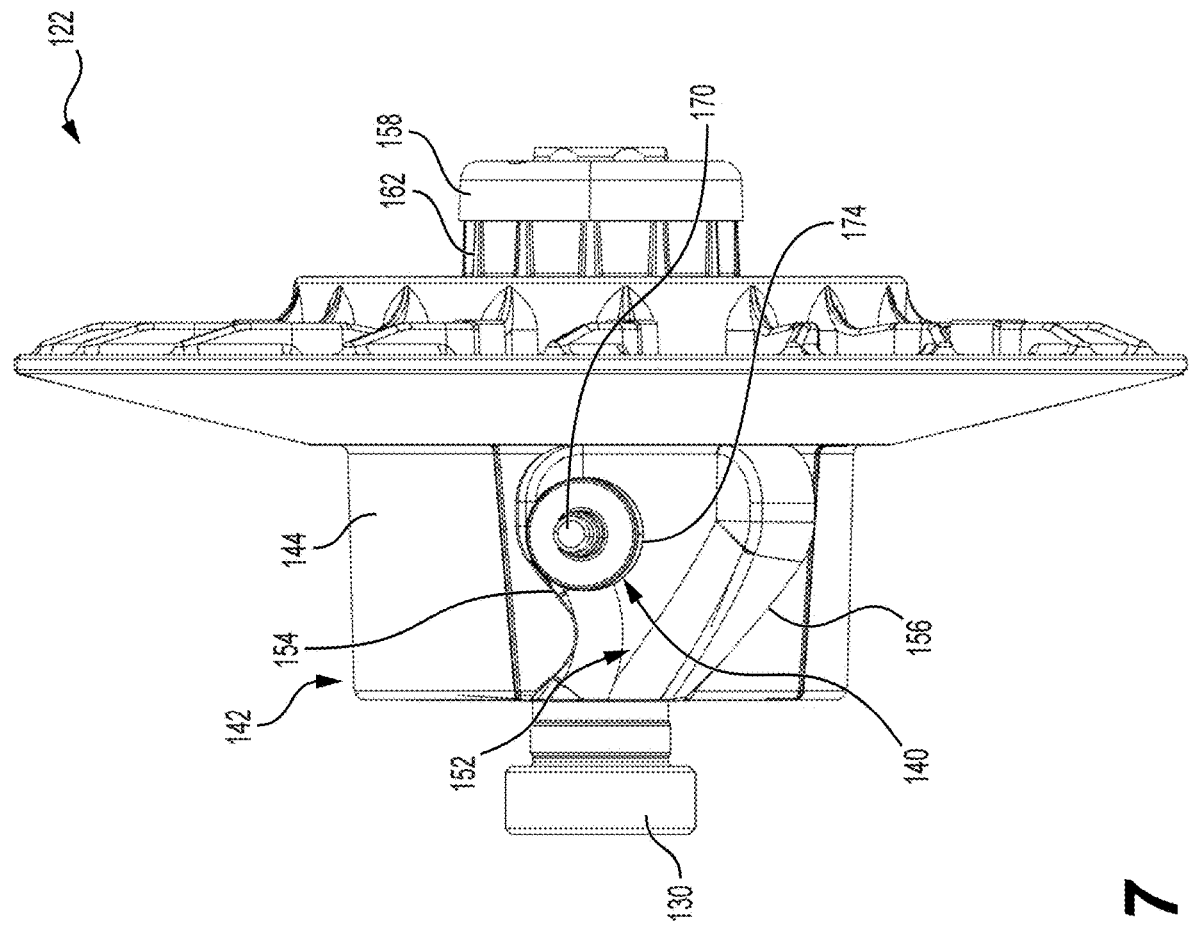
FIG. 7 is a top view of the roller assembly and of the movable sheave of the driven pulley of FIG. 4 during deceleration.
Figure 8:
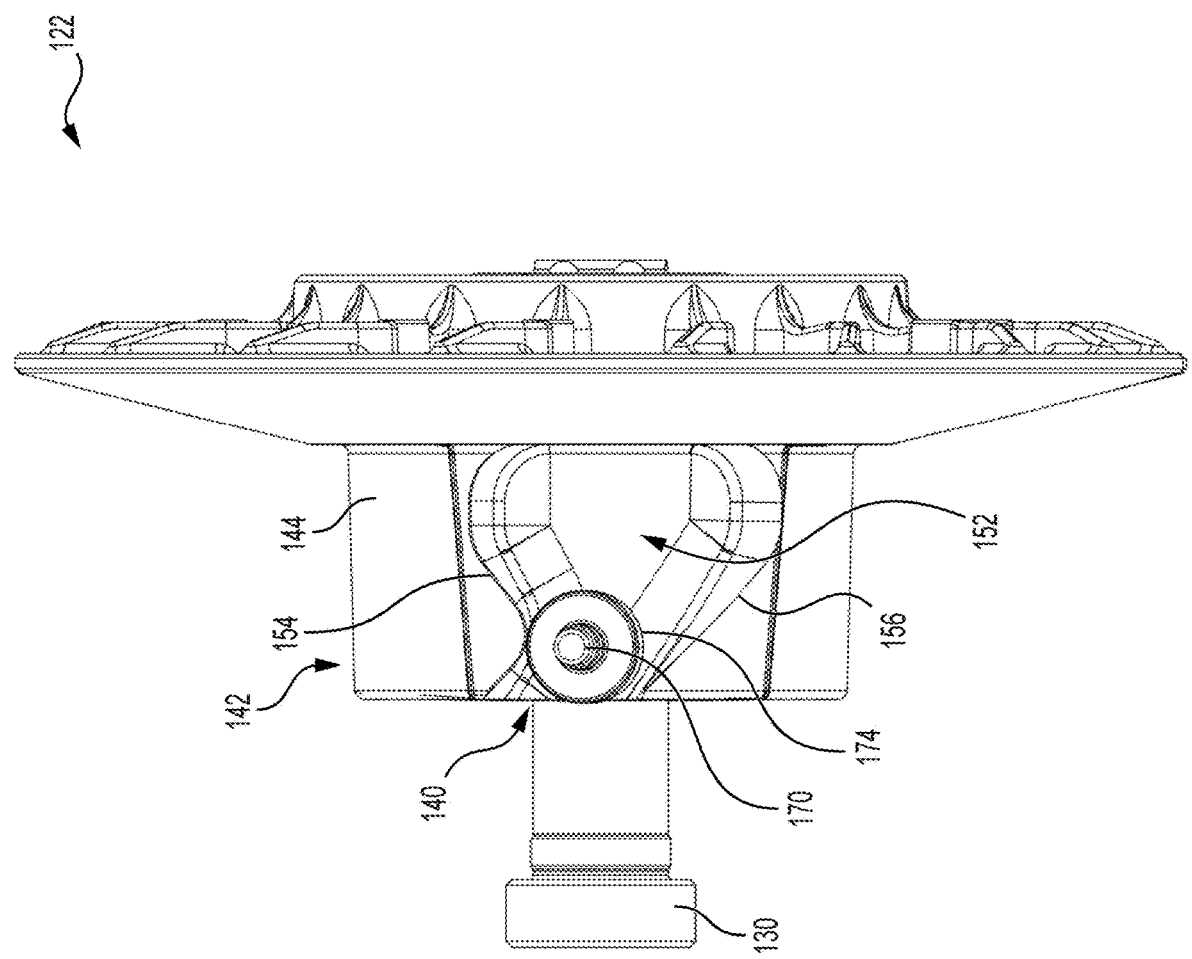
FIG. 8 is a top view of the roller assembly and of the movable sheave of the driven pulley of FIG. 5 during high-speed operation.
Figure 9:
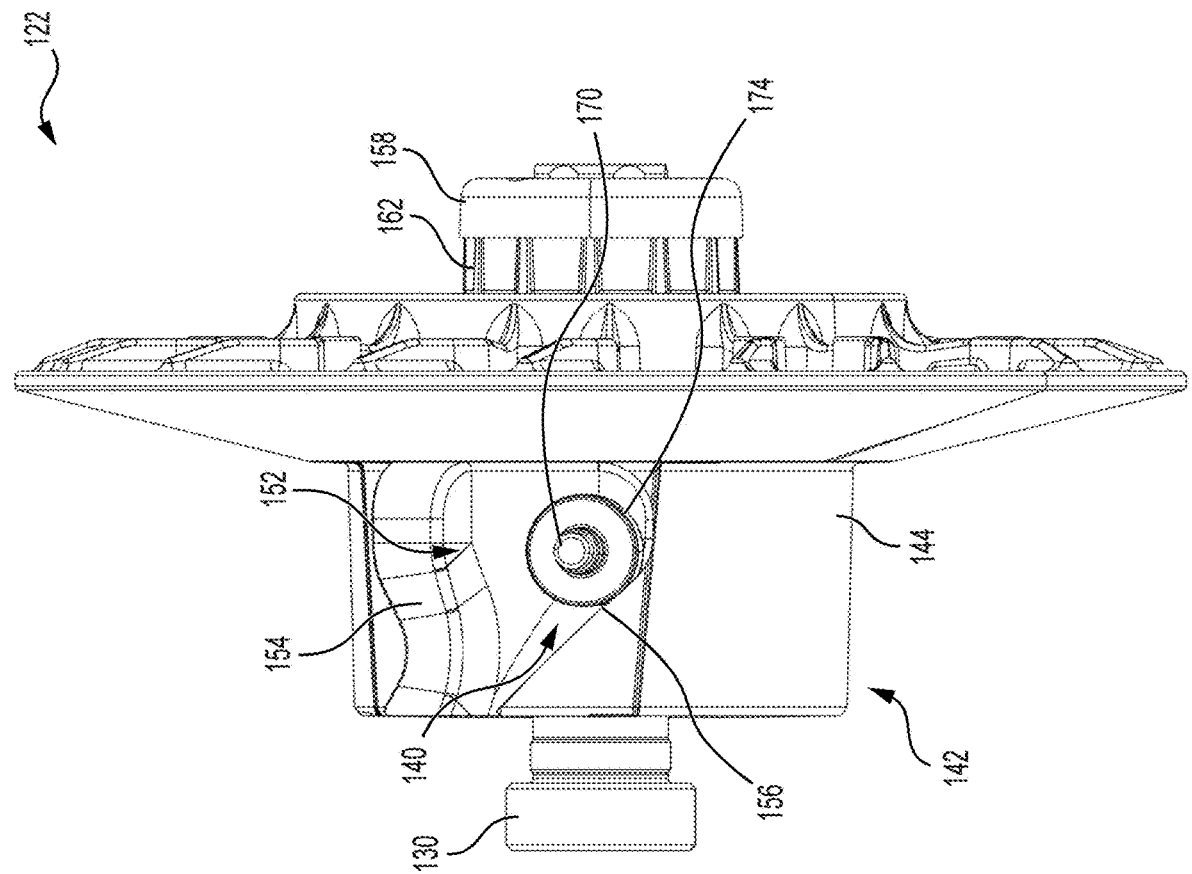
FIG. 9 is a top view of the roller assembly and of the movable sheave of the driven pulley of FIG. 4 during acceleration.

With reference to FIGS. 4 and 5, two roller assemblies 140 are connected to the fixed sheave 120. The roller assemblies 140 are disposed opposite to each other. The roller assemblies 140 will be described in more detail below. The movable sheave 122 has a hub 142 that extends in the hub 126 of the fixed sheave 120. The hub 142 has an outer wall 144, an inner wall 146, and a connecting wall 148 extending radially between the outer and inner walls 144, 146. Two bushings 150 are disposed between the inner wall 144 of the hub 142 and the sleeve 130, thus allowing the movable sheave 122 to move axially and rotationally relative to the fixed sheave 120. The outer wall 144 has two recesses 152. Each roller assembly 140 extends in a corresponding one of the recesses 152. Each recess 152 defines two ramps 154, 156 (FIG. 6). It is contemplated that instead of being defined by recesses 152, the ramps 154, 156 could be defined by walls connected to the outer wall 144. The ramps 154, 156 will be described in more detail below. It is contemplated that in some embodiments, the driven pulley 104 could have only one or more than two roller assemblies 140 with a corresponding number of recesses 152. In some embodiments, it is contemplated that the rollers 140 could be connected to the movable sheave 122 and that the fixed sheave 120 could have the ramps 154, 156.

A spring cap 158 is retained to the end of the sleeve 130 (i.e., the right end in the figures) by a retaining ring 160. The spring cap 158 holds a spring holder 162 that extends in the outer wall 144 of the hub 142 of the movable sheave 122 for all positions of the movable sheave 122 relative to the fixed sheave 120. The spring 124 is disposed in the space defined between the walls 114, 146, 148, the sleeve 130 and the spring holder 162. One end of the spring 124 abuts the spring holder 162. The other end of the spring 124 abuts the connecting wall 148. As the movable sheave 122 moves away from the fixed sheave 120, the spring 124 compresses as shown in FIG. 5.

Figure 10:
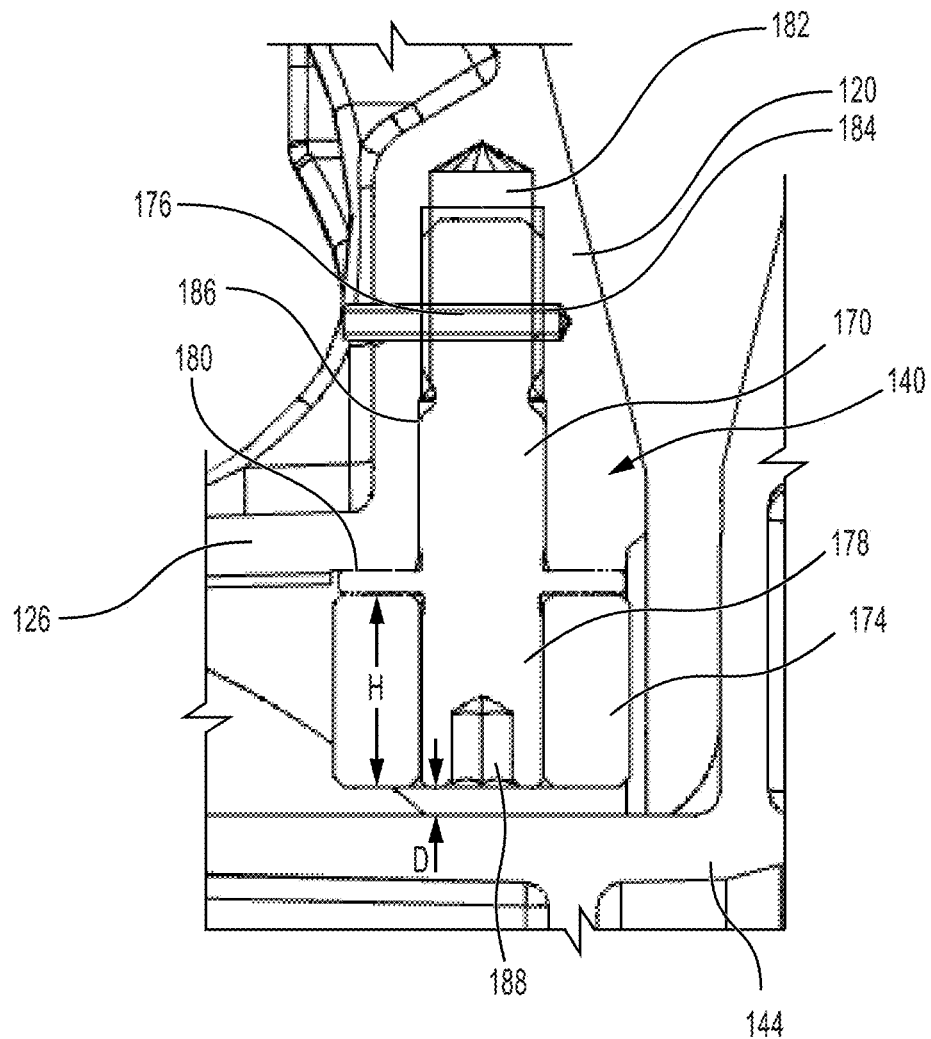
FIG. 10 is a close-up view of a portion of the cross-section of FIG. 4 containing a roller assembly, the roller assembly being an upper one of the two roller assemblies shown in FIG. 3.

Each roller assembly 140 has a pin 170 defining a radially extending pin axis 172 (FIG. 12) and a roller 174 disposed on the pin 170. The roller 174 is rotatable about the pin axis 172 and is slidable radially along the pin 170. The roller 174 is prevented from coming off the pin 170 by the outer wall 144 of the hub 142 of the movable sheave 122 since a radial distance D between the free end of the pin 170 and the outer wall 144 of the hub 142 is less than a height H of the roller 174, as can be seen in FIG. 10. It is contemplated that in some embodiments the roller 174 could be prevented from sliding radially along the pin 170. In the present embodiment, the pin 170 is made from steel and the roller 174 is made from plastic. More specifically, the roller 174 is made from polyimide such as Vespel™ from Dupont™. It is contemplated that the roller 174 could be made from a different plastic. It is also contemplated that the pin 170 and the roller 174 could be made from materials other than the ones described above.

As can be seen in FIGS. 6 to 9 for one of the roller assemblies 140, the roller 174 is disposed is the recess 152. During deceleration, the movable sheave 122 rotates relative to the fixed sheave 120 in a first direction until the roller 174 abuts the ramp 154, as can be seen by comparing FIG. 6 to FIG. 7. As the movable sheave 122 moves relative to the fixed sheave 120, the roller 174 rolls along the ramp 154, as can be seen by comparing FIG. 7 to FIG. 8. During acceleration, the movable sheave 122 rotates relative to the fixed sheave 120 in a second direction until the roller 174 abuts the ramp 156, as can be seen by comparing FIG. 6 to FIG. 9. As the movable sheave 122 moves relative to the fixed sheave 120, the roller 174 rolls along the ramp 156. The shapes of the ramps 154, 156 determines the axial movement profile of the movable sheave 122 relative to the fixed sheave 120. Since in the present embodiment the shapes of the ramps 154, 156 are different, for an equivalent force profile applied to the movable sheave 122, the axial movement profile of the movable sheave 122 relative to the fixed sheave 120 during acceleration differs from the axial movement profile of the movable sheave 122 relative to the fixed sheave 120 during deceleration.

Turning now to FIGS. 10 to 14, one of the roller assemblies 140 will be described. The other roller assembly 140 is the same and will therefore not be described. As previously described, the roller assembly 140 has a pin 170 and a roller 174. The pin 170 has a pulley pin portion 176, a roller pin portion 178 and an annular flange 180 disposed radially between the portions 176, 178. The pulley pin portion 176 (herein after the pin portion 176) is received in an aperture 182 defined in the fixed sheave 120 as seen in FIG. 10. The roller pin portion 178 (hereinafter the pin portion 178) has the roller 174 disposed on it. As such, the roller 174 is radially inward of the flange 180. The pin portion 178 extends radially inward from the hub 126 of the fixed sheave 120, and as such the pin portion 178 is radially inward of the pin portion 176. The annular flange 180 (hereinafter the flange 180) abuts the surface of the fixed sheave 120 surrounding the aperture 182. Recesses and/or raised portions (not shown) are formed around the aperture 182 such the flange 180 is in contact with a flat surface when the pin portion 176 inserted in the aperture 182. The flange 180 is sized to distribute the forces resulting from the torque applied by the roller 174 on the pin portion 178 over a large area around the aperture 182 on the fixed pulley 120, thereby helping to prevent stress cracks from forming around the aperture 182. The flange 180 also prevents the roller 174 from rubbing against the fixed sheave 120.

Figure 11:
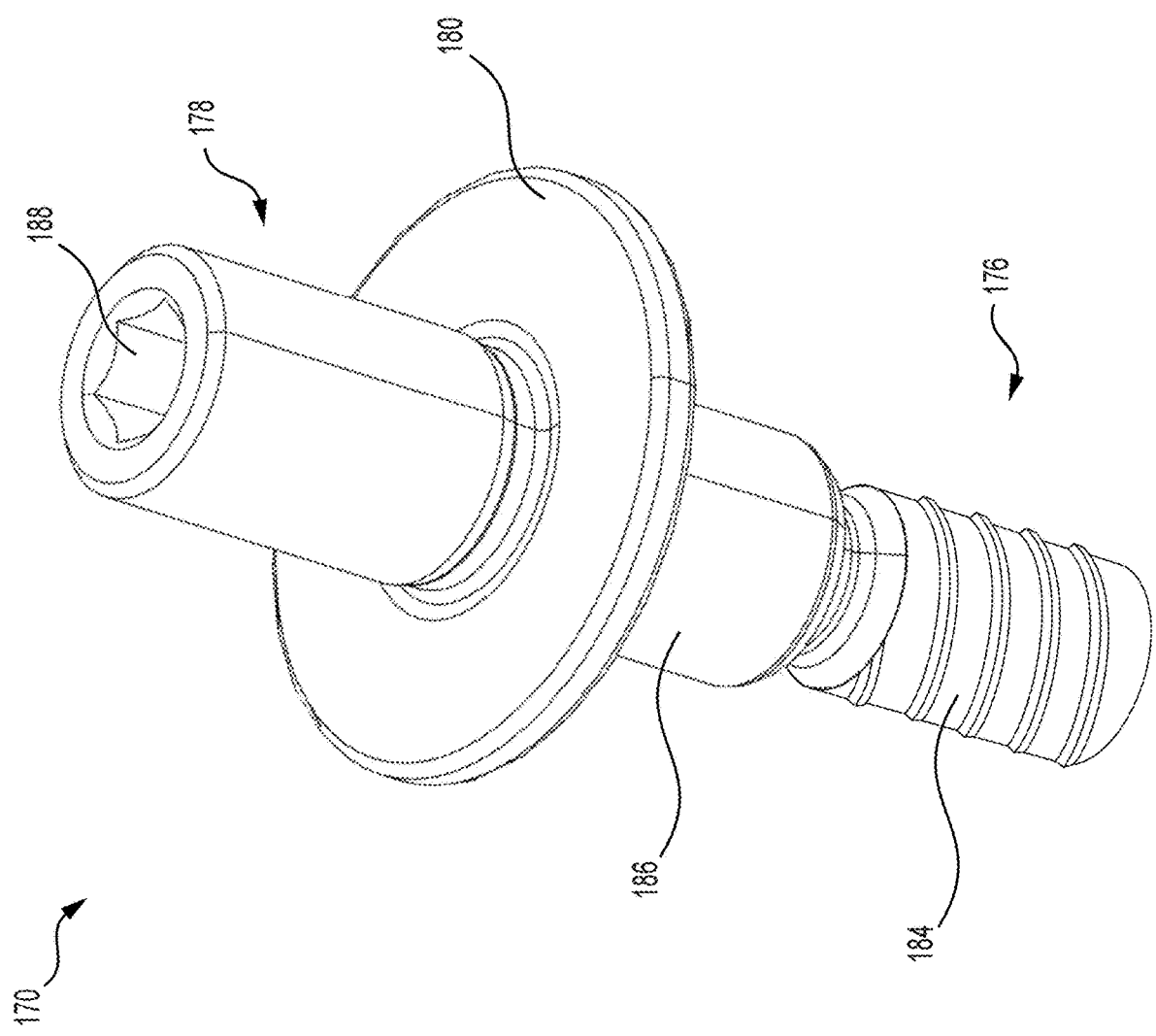
FIG. 11 is a perspective view of a pin of the roller assembly of FIG. 10.
Figure 12:
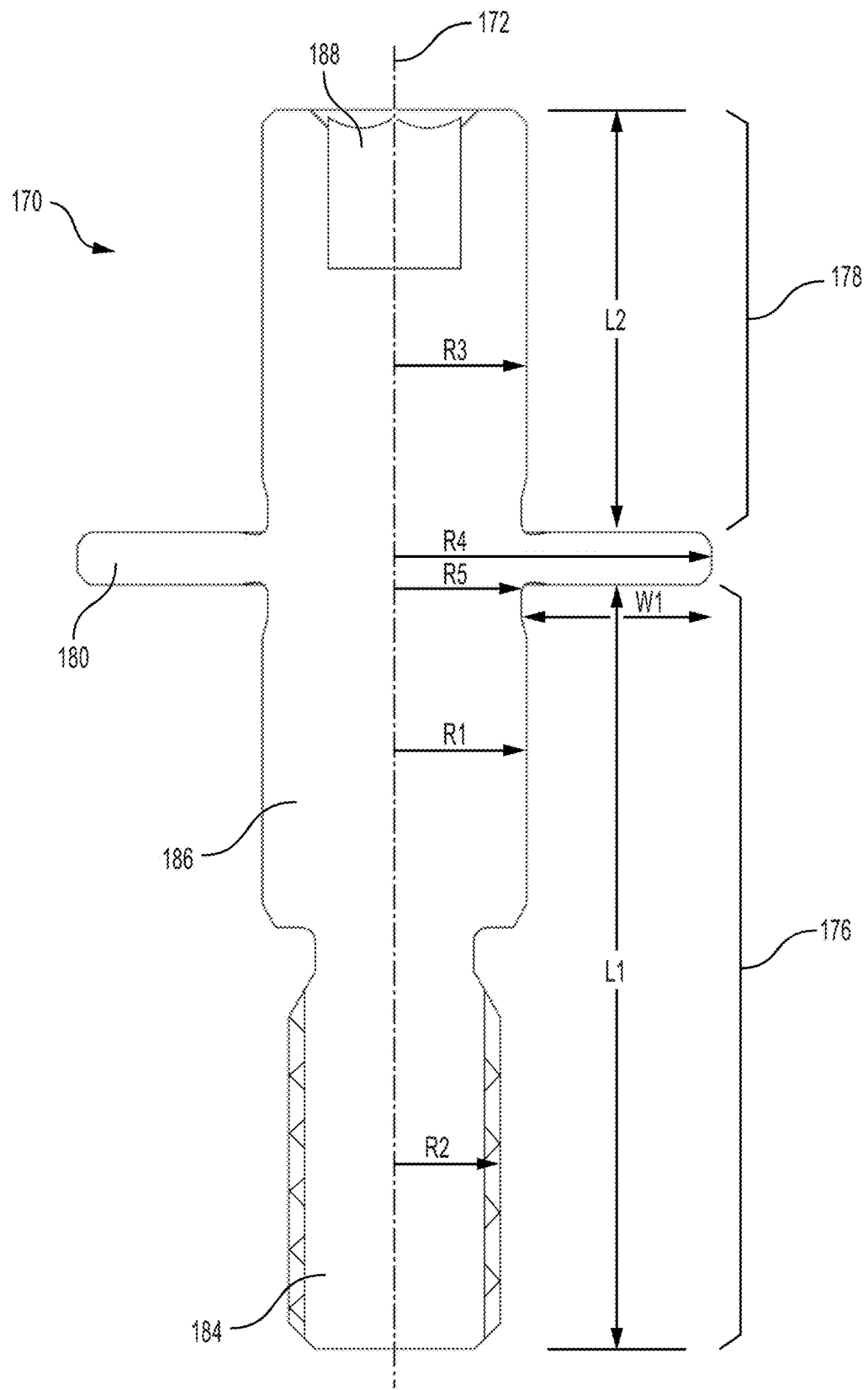
FIG. 12 is a cross-section of the pin of FIG. 11.

With reference to FIGS. 11 and 12, the pin portion 176 has a length L1 that is longer than a length L2 of the pin portion 178. The pin portion 176 has a threaded portion 184 and an unthreaded portion 186. The unthreaded portion 186 is disposed radially between the threaded portion 184 and the flange 180. The unthreaded portion 186 has a radius R1 and the threaded portion 184 has a radius R2. As can be seen in FIG. 12, the radius R2 is smaller than the radius R1. The aperture 182 has a threaded portion and an unthreaded portion corresponding to the threaded and unthreaded portions 184, 186 of the pin portion 176. The pin portion 178 has a hexagonal socket 188 defined in its free end. The hexagonal socket 188 is configured to receive a tool for screwing the pin 170 into the aperture 182 during installation. It is contemplated that the pin portion 178 could have a different socket type, such as a Torx Plus socket. The radii of the unthreaded portion of the aperture 182 and of the unthreaded portion 186 of the pin portion 176 are sized such that during installation, as the threaded portion 184 of the pin portion 176 engages the threaded portion of the aperture 182 and the pin portion 176 advances in the aperture 182, the unthreaded portion 186 of the pin portion 176 is press-fit in the aperture 182. This press-fit of the unthreaded portion 186 of the pin portion 176 also distributes the forces resulting from the torque applied by the roller 174 on the pin portion 178 over a large area around the aperture 182, thereby helping to prevent stress cracks from forming around the aperture 182. It is contemplated that in some embodiments, the unthreaded portion 186 of the pin portion 176 could not be press-fit in the aperture 182.

With reference to FIG. 12, the pin portion 178 has a radius R3 that is equal to the radius R1 of the unthreaded portion 186 of the pin portion 176. It is contemplated that the radius R3 could be greater or smaller than the radius R1. The flange 180 has a flange outer radius R4 and a flange inner radius R5. A difference between the flange outer radius R4 and the flange inner radius R5 is the annular width W1 of the flange 180.

Figure 13:
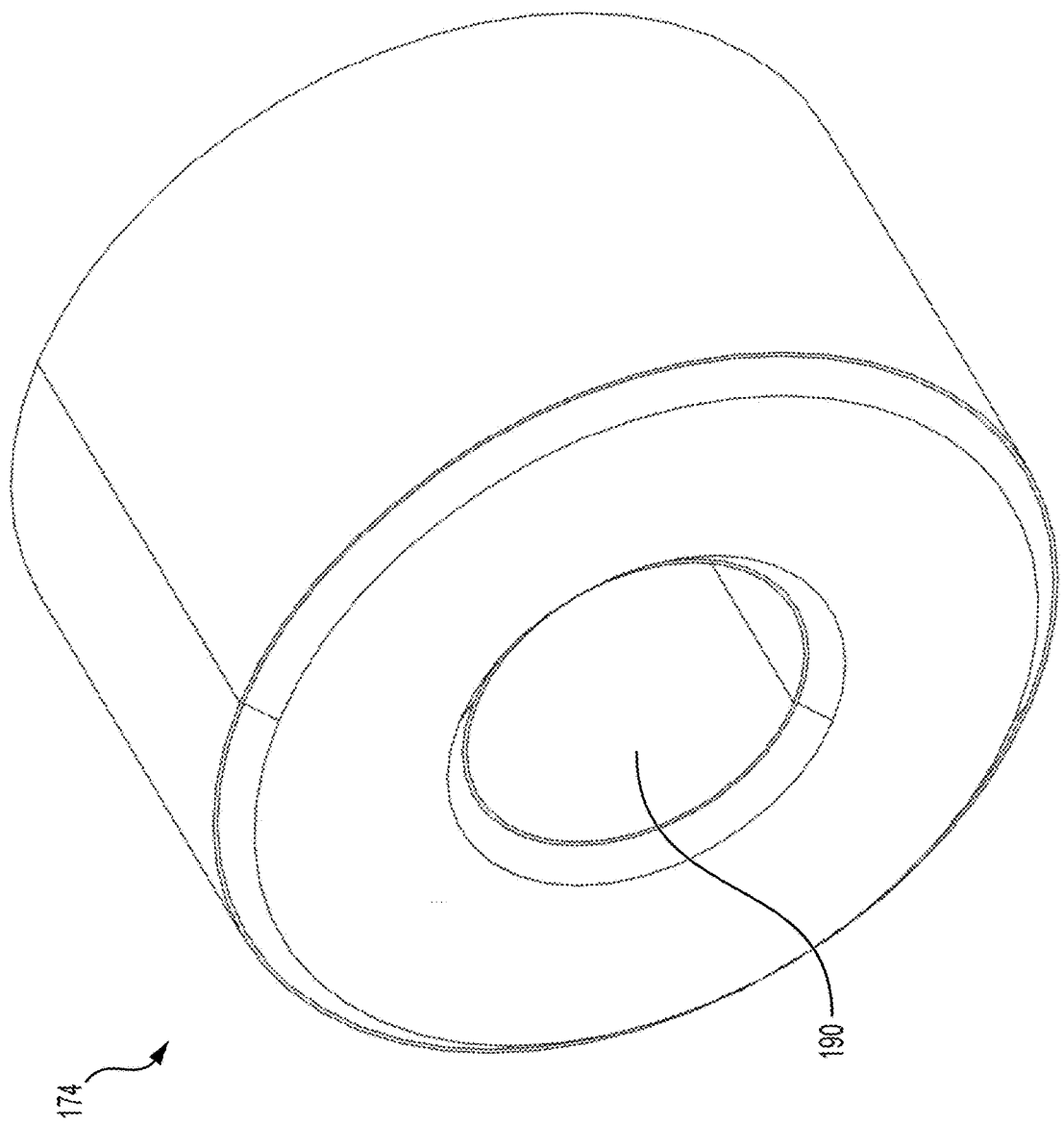
FIG. 13 is a perspective view of a roller of the roller assembly of FIG. 10.
Figure 14:
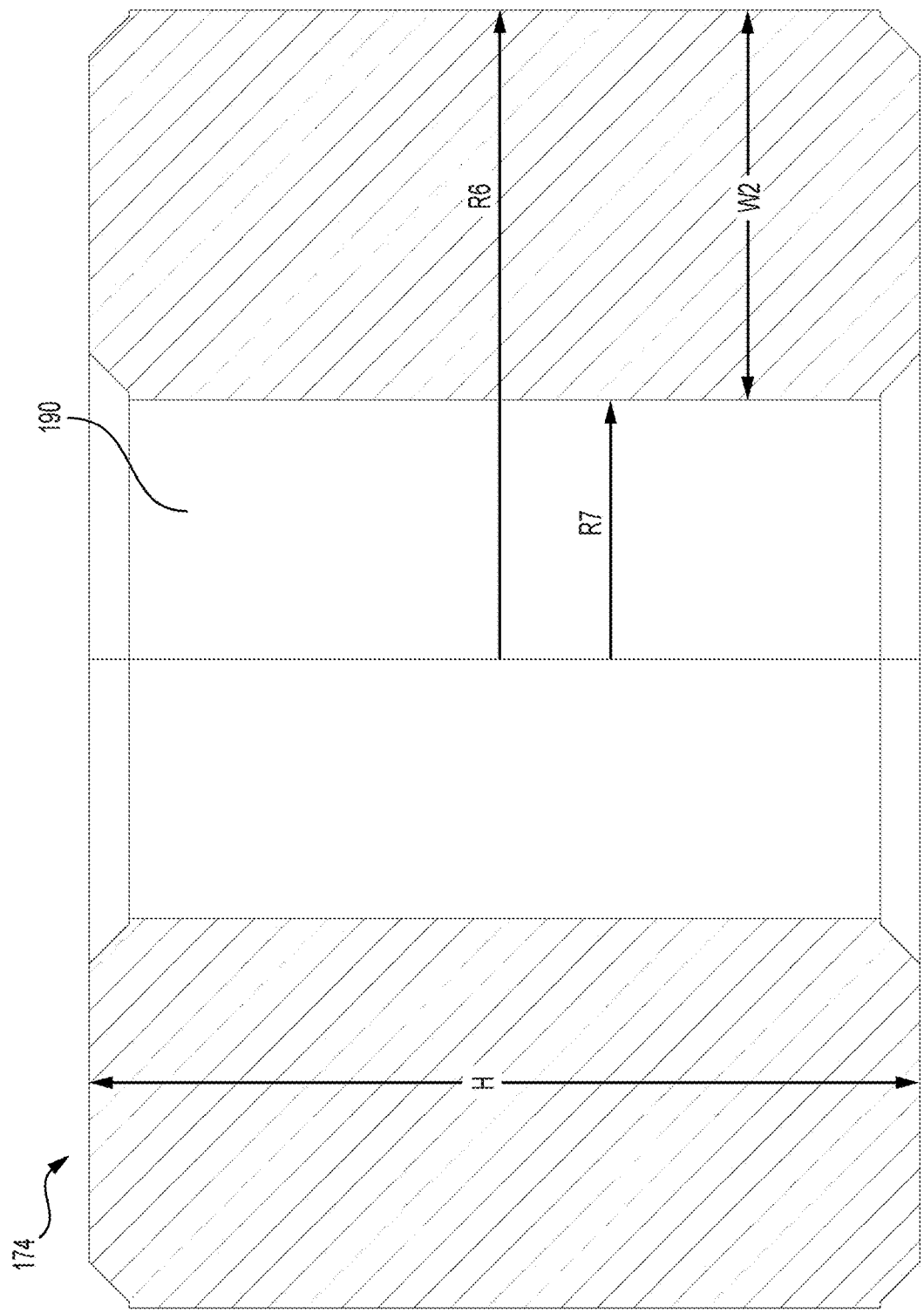
FIG. 14 is a cross-section of the roller of FIG. 13.

As can be seen in FIGS. 13 and 14, the roller 174 is an annular roller 174 having a central aperture 190. It is contemplated that in some embodiments one end of the roller 174 could be closed such that the roller 174 would have an annular portion around the pin portion 178 and the closed end of the roller 174 would cover the free end of the pin portion 178. With reference to FIG. 14, the roller 174 has a roller outer radius R6 and a roller inner radius R7. A difference between the roller outer radius R6 and the roller inner radius R7 is the annular width W2 of the roller 174.

As can be seen in FIG. 10, the annular width W1 of the flange 180 is slightly smaller than the annular width W2 of the roller 174. It is contemplated that the annular width W1 could be equal to or larger than the annular width W2. In some embodiments, the annular width W1 is at least half of the annular width W2. In some embodiments, the annular width W1 is at least 75 percent of the annular width W2. In some embodiments, the annular width W1 is at least 90 percent of the annular width W2. With reference to their radii, in the present embodiment the flange outer radius R4 of the flange 180 is slightly smaller than the roller outer radius R6 of the roller 174. It is contemplated that the flange outer radius R4 could be equal to or larger than the roller outer radius R6. In some embodiments, the flange outer radius R4 is at least half of the roller outer radius R6. In some embodiments, the flange outer radius R4 is at least 75 percent of the roller outer radius R6. In some embodiments, the flange outer radius R4 is at least 90 percent of the roller outer radius R6. In some embodiments, the flange outer radius R4 is at least 70 percent of the height H of the roller 174. Such embodiments have a flange 180 that is sized to help prevent stress cracks from forming around the aperture 182, as described above.

Figure 15:
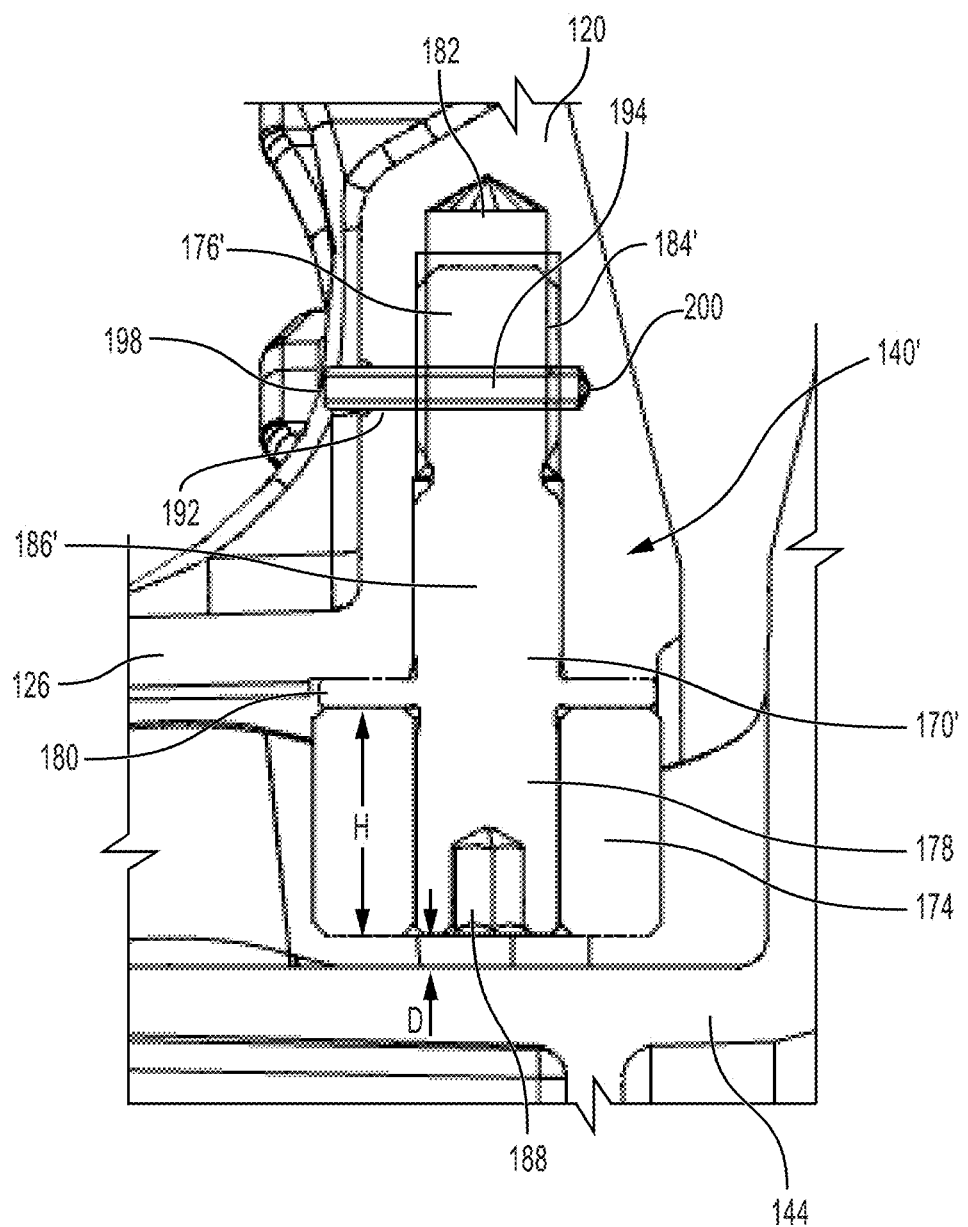
FIG. 15 is a close-up view of a portion of a cross-section similar to the cross-section of FIG. 4 containing an alternative embodiment of a roller assembly.
Figure 16:
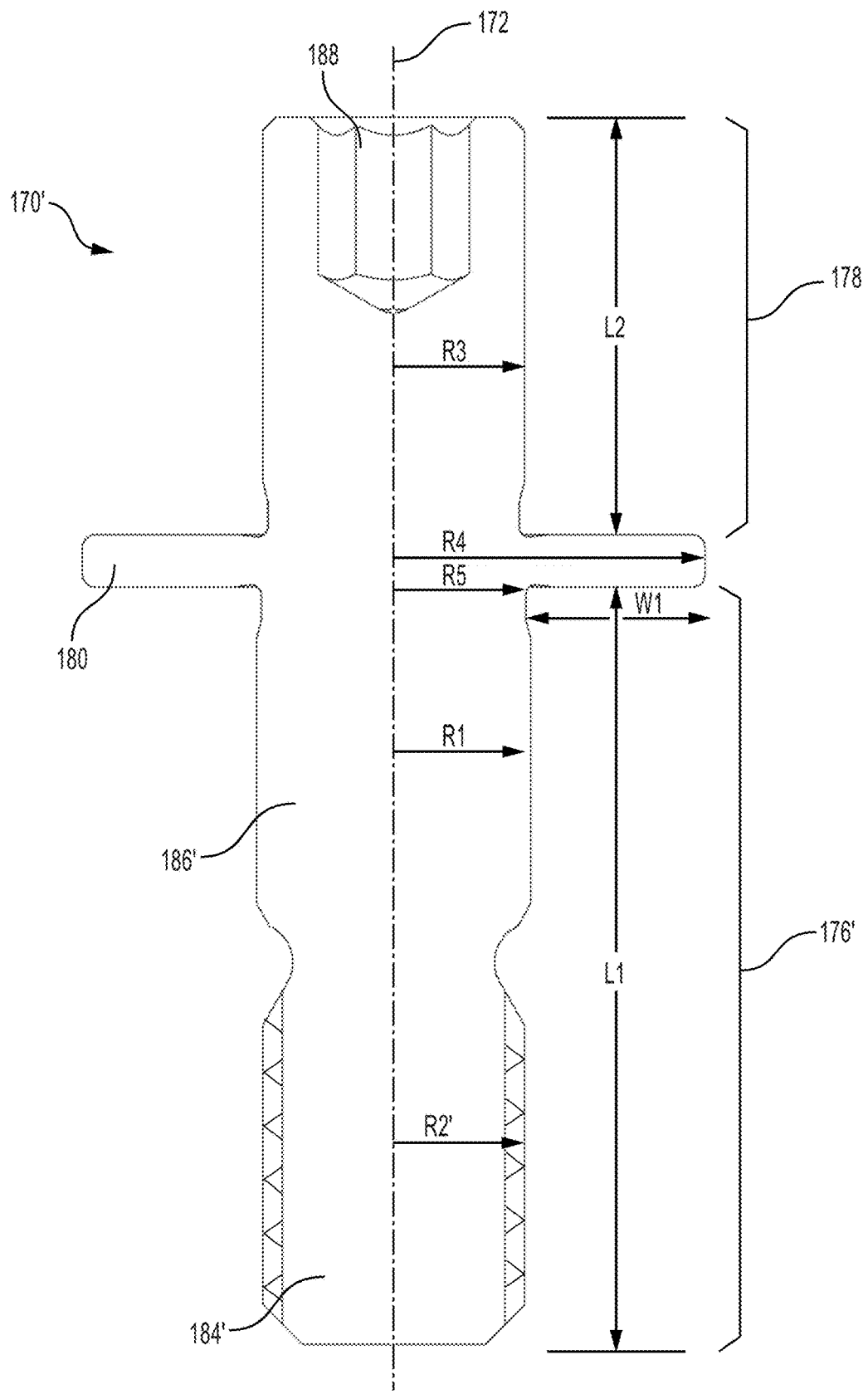
FIG. 16 is a cross-section of a pin of the roller assembly of FIG. 15.
Figure 17:
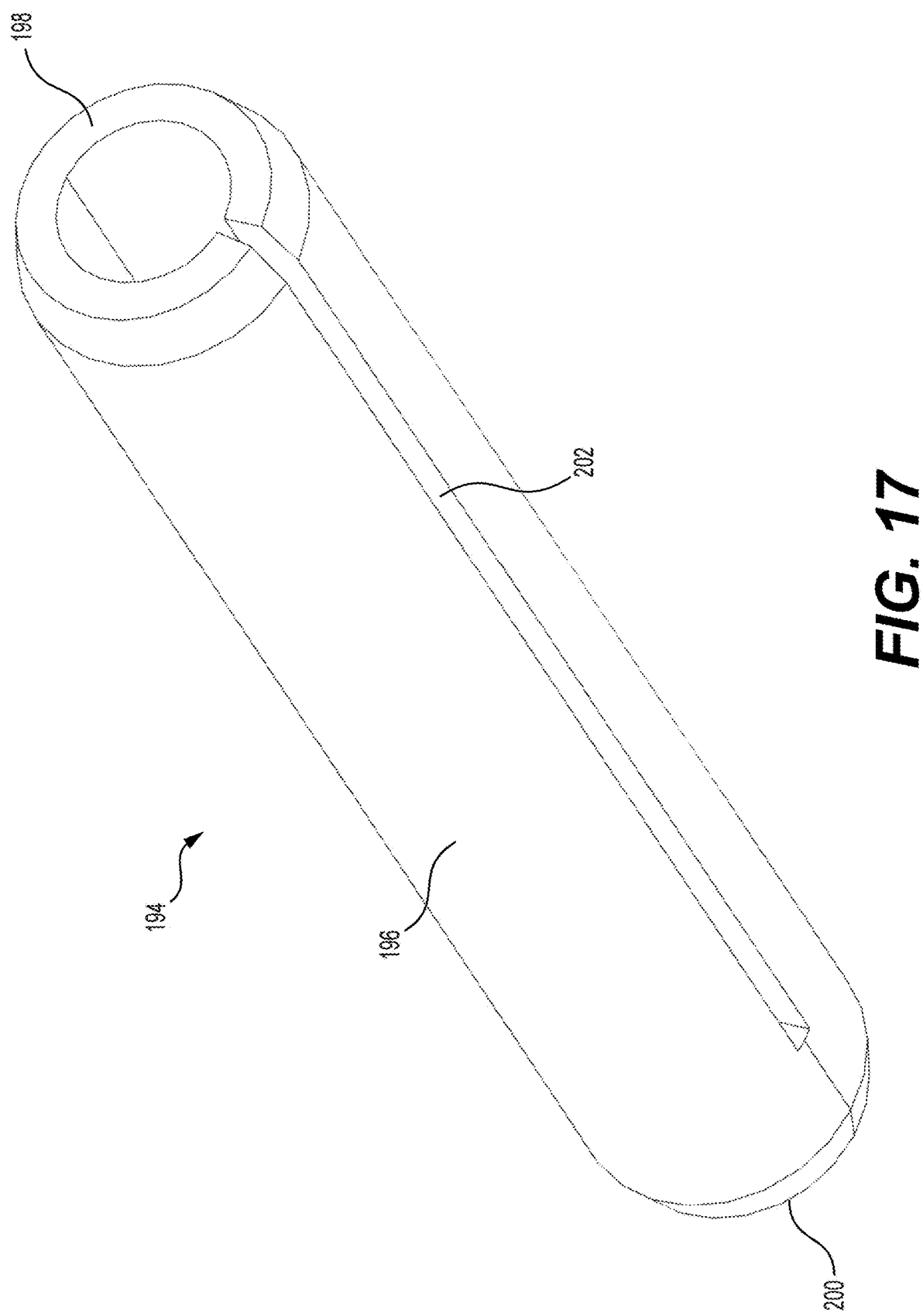
FIG. 17 is a perspective view of a spring pin of FIG. 15.

With reference to FIGS. 15 to 17, a roller assembly 140' will be described. The roller assembly 140' is an alternative embodiment of the roller assembly 140. Elements of the roller assembly 140' that are the same as those of the roller assembly 140 have been labeled with the same reference numerals and will not be described again in detail.

The roller assembly 140' has a pin 170' and a roller 174, which is the same as the roller 174 described above. The pin 170' has a pulley pin portion 176', a roller pin portion 178 and an annular flange 180 disposed radially between the portions 176', 178. The roller pin portion 178 and the annular flange 180 are the same as roller pin portion 178 and the annular flange 180 described above. The pulley pin portion 176' (herein after the pin portion 176') is received in the aperture 182 defined in the fixed sheave 120 as seen in FIG. 15.

With reference to FIG. 16, the pin portion 176' has a length L1 that is longer than a length L2 of the pin portion 178. The pin portion 176' has a threaded portion 184' and an unthreaded portion 186'. The unthreaded portion 186' is disposed radially between the threaded portion 184' and the flange 180. The unthreaded portion 186' has the radius R1 and the threaded portion 184' has a radius R2'. The radius R2' is slightly smaller than the radius R1. In one embodiment, the radius R2' is 0.25 mm smaller that the radius R1. As can be seen by comparing FIGS. 12 and 16, the radius R2 of the pin portion 176 is smaller than the radius R2' of the pin portion 176'. The pin portion 178 has a radius R3 that is equal to the radius R1 of the unthreaded portion 186' of the pin portion 176'. It is contemplated that the radius R3 could be greater or smaller than the radius R1'.

With reference to FIG. 15, the radii of the unthreaded portion of the aperture 182 and of the unthreaded portion 186' of the pin portion 176' are sized such that during installation, as the threaded portion 184' of the pin portion 176' engages the threaded portion of the aperture 182 and the pin portion 176' advances in the aperture 182, the unthreaded portion 186' of the pin portion 176' slides in the aperture 182. Once the pin portion 176' is fully inserted in the aperture 182, a hole 192 is drilled through the fixed sheave 120 and through the pin portion 176', and a spring pin 194 is inserted in the hole 192. More specifically, the hole 192 is drilled through the threaded portion 184' of the pin portion 176'. It is contemplated that in some embodiments, the hole 192 could be drilled through the unthreaded portion 186' of the pin portion 176'. The spring pin 194 prevents the pin portion 176' from unscrewing from the aperture 182. In embodiments where the roller assembly 140' is provided on the movable sheave 122, the hole 192 is drilled through the movable sheave 122 and through the pin portion 176'.

With reference to FIG. 17, the spring pin 194 has a tubular spring pin body 196 having opposed beveled ends 198, 200. The spring pin body 196 has a slit 202 extending from the end 198 along a majority of the spring pin body 196. The slit 202 does not extend all the way to the end 200. When inserting the spring pin 194 in the hole 192, the end 200 of the spring pin 194 is first inserted in the hole 192.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A driven pulley for a continuously variable transmission comprising:
   a fixed sheave;
   a movable sheave operatively connected to the fixed sheave, the movable sheave being movable axially relative to the fixed sheave;
   a spring biasing the movable sheave axially toward the fixed sheave; and
   at least one roller assembly connected to one of the fixed sheave and the movable sheave,
   another one of the fixed sheave and the movable sheave having at least one ramp configured for abutting the at least one roller assembly;
   each roller assembly of the at least one roller assembly having:
      a pin defining a radially extending pin axis, the pin having:
         a first pin portion received in an aperture defined in the one of the fixed sheave and the movable sheave;
         a second pin portion extending radially from the one of the fixed sheave and the movable sheave; and
         an annular flange extending from and disposed radially between the first pin portion and the second pin portion, the flange having a first annular width, the flange abutting a surface of the one of the fixed sheave and the movable sheave surrounding the aperture; and
      a roller disposed on the second pin portion, the roller being rotatable about the pin axis, the roller being axially and radially between the fixed sheave and the movable sheave, the roller having at least one annular portion, the at least one annular portion of the roller having a second annular width,
      the first annular width being at least half of the second annular width.

2. The driven pulley of claim 1, wherein the movable sheave is rotatable relative to the fixed sheave.

3. The driven pulley of claim 2, wherein for each roller assembly of the at least one roller assembly:
   the at least one ramp comprises a first ramp and a second ramp;
   in response to the movable sheave rotating relative to the fixed sheave in a first direction, the roller abuts the first ramp; and
   in response to the movable sheave rotating relative to the fixed sheave in a second direction, the roller abuts the second ramp.

4. A driven pulley for a continuously variable transmission comprising:
a fixed sheave;
a movable sheave operatively connected to the fixed sheave, the movable sheave being movable axially relative to the fixed sheave;
a spring biasing the movable sheave axially toward the fixed sheave; and
at least one roller assembly connected to one of the fixed sheave and the movable sheave,
another one of the fixed sheave and the movable sheave having at least one ramp configured for abutting the at least one roller assembly;
each roller assembly of the at least one roller assembly having:
a pin defining a radially extending pin axis, the pin having:
a first pin portion received in an aperture defined in the one of the fixed sheave and the movable sheave;
a second pin portion extending radially from the one of the fixed sheave and the movable sheave; and
an annular flange disposed radially between the first pin portion and the second pin portion, the flange having a first annular width, the flange abutting a surface of the one of the fixed sheave and the movable sheave surrounding the aperture; and
a roller disposed on the second pin portion, the roller being rotatable about the pin axis, the roller being slidable radially along the second pin portion, the roller having at least one annular portion, the at least one annular portion of the roller having a second annular width,
the first annular width being at least half of the second annular width.

5. The driven pulley of claim 1, wherein for each roller assembly of the at least one roller assembly:
the first pin portion is longer than the second pin portion.

6. The driven pulley of claim 5, wherein for each roller assembly of the at least one roller assembly:
the first annular width is at least 90 percent of the second annular width.

7. The driven pulley of claim 1, wherein for each roller assembly of the at least one roller assembly a spring pin is inserted through the first pin portion of the pin and the one of the fixed sheave and the movable sheave.

8. A driven pulley for a continuously variable transmission comprising:
a fixed sheave;
a movable sheave operatively connected to the fixed sheave, the movable sheave being movable axially relative to the fixed sheave;
a spring biasing the movable sheave axially toward the fixed sheave; and
at least one roller assembly connected to one of the fixed sheave and the movable sheave,
another one of the fixed sheave and the movable sheave having at least one ramp configured for abutting the at least one roller assembly;
each roller assembly of the at least one roller assembly having:
a pin defining a radially extending pin axis, the pin having:
a first pin portion received in an aperture defined in the one of the fixed sheave and the movable sheave,
the first pin portion having a threaded portion and an unthreaded portion,
the unthreaded portion being disposed radially between the threaded portion and the flange;
a second pin portion extending radially from the one of the fixed sheave and the movable sheave; and
an annular flange disposed radially between the first pin portion and the second pin portion, the flange having a first annular width, the flange abutting a surface of the one of the fixed sheave and the movable sheave surrounding the aperture; and
a roller disposed on the second pin portion, the roller being rotatable about the pin axis, the roller having at least one annular portion, the at least one annular portion of the roller having a second annular width,
the first annular width being at least half of the second annular width.

9. The driven pulley of claim 8, wherein for each roller assembly of the at least one roller assembly:
a radius of the threaded portion is smaller than a radius of the unthreaded portion.

10. The driven pulley of claim 8, wherein for each roller assembly of the at least one roller assembly:
the unthreaded portion is press-fit in the aperture.

11. The driven pulley of claim 1, wherein:
the at least one roller assembly is connected to the fixed sheave; and
the movable sheave has the at least one ramp.

12. The driven pulley of claim 11, wherein for each roller assembly of the at least one roller assembly:
the second pin portion is radially inward of the first pin portion.

13. The driven pulley of claim 11, wherein:
the movable sheave has a hub defining the at least one ramp;
the hub extends in the fixed sheave; and
for each roller assembly of the at least one roller assembly, the roller is disposed radially between the flange and the hub, and the roller is radially inward of the flange.

14. The driven pulley of claim 13, wherein for each roller assembly of the at least one roller assembly:
a radial distance between a free end of the second pin portion and the hub is less than a height of the roller.

15. The driven pulley of claim 1, wherein for each roller assembly of the at least one roller assembly:
the flange has a flange outer radius;
the roller has a roller outer radius; and
the flange outer radius is at least half of the roller outer radius.

16. The driven pulley of claim 15, wherein for each roller assembly of the at least one roller assembly:
the flange outer radius is at least 90 percent of the roller outer radius.

17. The driven pulley of claim 15, wherein for each roller assembly of the at least one roller assembly:
the flange outer radius is at least 70 percent of a height of the roller.

18. The driven pulley of claim 1, wherein the at least one roller assembly is two roller assemblies disposed opposite each other.

19. A continuously variable transmission comprising:
a drive pulley;
the driven pulley of claim 1; and
a belt looped around the drive and driven pulleys.

20. A powertrain for a vehicle comprising:
a motor having a motor shaft;

the continuously variable transmission of claim 19, the drive pulley being operatively connected to and driven by the motor shaft; and a driveshaft operatively connected to and driven by the driven pulley.

\* \* \* \* \*